United States Patent
Arai et al.

(10) Patent No.: US 6,574,367 B1
(45) Date of Patent: Jun. 3, 2003

(54) METHOD AND APPARATUS FOR PATTERN MATCHING ENCODING

(75) Inventors: Mitsutoshi Arai, Tokyo (JP); Takahiro Hongu, Tokyo (JP); Kouichirou Hirao, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/003,713

(22) Filed: Jan. 7, 1998

(30) Foreign Application Priority Data

Jan. 14, 1997 (JP) .............................. 9-004882

(51) Int. Cl.[7] ................................. G06K 9/46
(52) U.S. Cl. ..................... 382/203; 382/197; 382/205; 382/216; 382/218; 382/247; 375/240.1; 358/539; 358/426.02
(58) Field of Search ................................. 382/190, 198, 382/203, 209, 197, 218, 243, 247, 239, 240; 358/433, 467, 470; 375/240.1; 348/396.1; 341/50

(56) References Cited

U.S. PATENT DOCUMENTS

| | | | | |
|---|---|---|---|---|
| 3,980,809 A | * | 9/1976 | Cook .......................... | 358/433 |
| 4,410,916 A | * | 10/1983 | Pratt et al. .................. | 358/433 |
| 4,589,139 A | * | 5/1986 | Hada et al. ................. | 382/144 |
| 4,606,069 A | * | 8/1986 | Johnsen ...................... | 382/243 |
| 4,866,784 A | * | 9/1989 | Baraki ........................ | 382/289 |
| 4,972,499 A | * | 11/1990 | Kurosawa ................... | 382/227 |
| 5,033,097 A | * | 7/1991 | Nakamura ................... | 382/174 |
| 5,274,719 A | * | 12/1993 | Taniguchi et al. .......... | 382/197 |
| 5,287,275 A | * | 2/1994 | Kimura ........................ | 707/5 |
| 5,303,313 A | * | 4/1994 | Mark et al. ................. | 382/235 |
| 5,465,118 A | * | 11/1995 | Hancock et al. .......... | 348/396.1 |
| 5,467,411 A | * | 11/1995 | Tanaka et al. ............. | 382/113 |
| 5,500,907 A | * | 3/1996 | Kunitake et al. .......... | 382/240 |
| 5,598,484 A | * | 1/1997 | Suzuki et al. .............. | 382/239 |
| 5,671,293 A | * | 9/1997 | Niki ........................... | 382/224 |
| 5,729,629 A | * | 3/1998 | Dai ............................ | 382/187 |
| 5,854,854 A | * | 12/1998 | Cullen et al. .............. | 382/176 |
| 5,870,494 A | * | 2/1999 | Kanda et al. .............. | 382/247 |

FOREIGN PATENT DOCUMENTS

JP    WO97/01237   *  1/1997   .................. 341/50

OTHER PUBLICATIONS

P.G. Howard, "Lossless and Lossy Compression of Text Images by Soft Pattern Matching", ISO/IEC JTC 1/SC 29/WGI 1 N205, Jun. 30, 1995, pp. 1–29.

* cited by examiner

Primary Examiner—Bhavesh M. Mehta
Assistant Examiner—Gregory Desire
(74) Attorney, Agent, or Firm—Sughrue Mion, PLLC

(57) ABSTRACT

An apparatus for pattern matching encoding includes a pattern extracting unit for extracting patterns in input binary or multi-level image data, an accumulating/match-checking unit for accumulating each extracted pattern and executing a match-check thereof with patterns that have been accumulated, a line segment checking unit for checking each pixel in the match pattern or the extracted pattern as to which line segment in directions the pixel is positioned on, and an encoding unit for encoding the extracted pattern by selecting a template having an optimum form according to the result of the line segment checking. The codes in pattern matching encoding are reduced, and the efficiency of code transmission and code accumulation is improved.

14 Claims, 4 Drawing Sheets

1 – 11: REFERENCE PIXELS
Ⓟ : PIXELS UNDER PROCESS

METHOD AND APPARATUS FOR PATTERN MATCHING ENCODING

BACKGROUND OF THE INVENTION (1) Field of the Invention

The present invention relates to an image data encoding system, and more particularly to a method and an apparatus for pattern matching encoding in which the number of codes can be reduced.

(2) Description of the Related Art

An example of the technique of the kind to which the present invention relates is disclosed under the title "Lossless and Lossy Compression of Test Images by Soft Pattern Matching" by Paul G. Howard (AT & T Bell Labs.) in ISO/IEC JTC 1/SC 29/WGI N205, issued on Jun. 30, 1995, pp. 1–29).

The above technique is an effective encoding method mainly for binary image data including letter images, and adopts pattern matching for the encoding. In this method, patterns are extracted in small units, such as a letter or letters, from an image (the extracted images being hereinafter referred to as "patterns"). The pattern extraction is made by a well-known method such as a boundary tracing method.

The extracted patterns are compared with letter image data (hereinafter referred to as "library") having been preliminarily prepared and stored. When the same letter image as the pattern exists in the library, the library image is simultaneously referred to during the encoding of the pattern. The reference to the pattern and library is made at a region of pixels (a dozen or so) called a template. The region is shifted for the entire pattern (and library) to carry out sequential encoding.

The template adopts a form which has proven to be highly efficient through experiments. Even such a highly efficient template form, however, may not be optimum depending on the characteristics of the letter image, and in such a case the encoding efficiency is deteriorated.

Thus, in the prior art, when the encoding is carried out utilizing the pattern matching, the form that the template adopts cannot be optimum depending on the pattern characteristics thus resulting in unsatisfactory encoding efficiency.

SUMMARY OF THE INVENTION

An object of the present invention, therefore, is to overcome the problems existing in the prior art, and to provide a method and an apparatus for pattern matching encoding in which the number of codes can be reduced, thus improving the efficiency of code transmission and also the efficiency of code accumulation.

According to an aspect of the invention, there is provided a method for pattern matching encoding of patterns in input binary or multi-level image data, the method comprising the steps of:

segment-checking as to which line segments in directions in an image a pixel being processed is positioned on; and encoding by switching templates with optimum forms based on a result of the segment-checking such that efficiency of the encoding is enhanced.

More specifically, the method for pattern matching of the invention comprises:

a first step of extracting patterns from the image data supplied from an input terminal;

a second step of accumulating each extracted pattern and executing a match check thereof with patterns that have been accumulated;

a third step of checking, when a match pattern is found, for each pixel in the match pattern as to which line segments in directions the pixel is positioned on;

a fourth step of selecting an optimum template according to the line segment determined as a result of the segment checking; and a fifth step of encoding the extracted pattern by an arithmetic encoding method with the selected template.

The step for checking the line segments may be made with respect to at least a horizontal line segment, a vertical line segment and a slanted line segment.

According to another aspect of the invention, there is also provided an apparatus for pattern matching encoding of patterns, comprising:

a pattern extracting unit for extracting patterns from input binary or multi-level image data;

an accumulating/match-checking unit for accumulating each extracted pattern and executing a match check thereof with patterns that have been accumulated;

a line segment checking unit for checking each pixel in the match pattern or the extracted pattern as to which line segment in directions the pixel is positioned on; and an encoding unit for encoding the extracted pattern by selecting a template having an optimum form according to the result of the line segment checking.

In the above apparatus, the line segment check in the line segment checking unit may be made at least with respect to a horizontal line segment, a vertical line segment and a slanted line segment.

In the above apparatus, the encoding unit includes a first signal switching unit for sorting out match patterns, a second signal switching unit for sorting out extracted patterns, a plurality of template units corresponding to the horizontal, vertical and slanted line segments, and an arithmetic encoding unit. The first signal switching unit supplies the match pattern to either one of the template units according to the result of the line segment checking. The second signal switching unit supplies the extracted pattern to either one of the template units according to the result of the line segment checking. The template units output a template value by referring simultaneously to the match and extracted patterns. The arithmetic encoding unit arithmetically encodes the template value received from the template units and outputting code data.

BRIEF DESCRIPTION OF THE DRAWINGS

The above and other objects, features and advantages of the present invention will be apparent from the following description of a preferred embodiment of the invention explained with reference to the accompanying drawings, in which.

PREFERRED EMBODIMENT OF THE INVENTION

Figure 1:
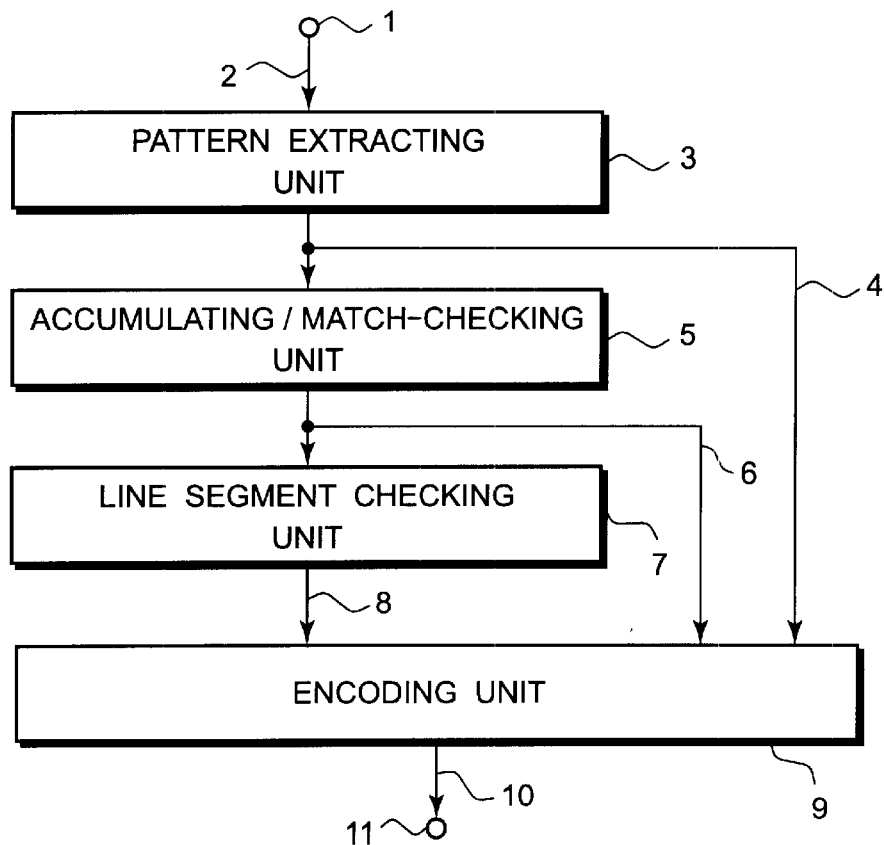
FIG. 1 is a block diagram for showing an operating mode of a pattern matching encoding apparatus according to the invention.

Now, the invention will be described in detail in conjunction with an embodiment of the invention with reference to the accompanying drawings. FIG. 1 outlines an operating mode of the encoder according to the invention. A pattern extracting unit 3 extracts patterns from image data 2 supplied from an input terminal 1. The pattern extraction is made by a known method such as a boundary tracing method. Each extracted pattern 4 is supplied to and accumulated in accumulating/match-checking unit 5, and is also match-checked with patterns that have been accumulated (hereinafter referred to as "library"). When a match pattern 6 is found, it is supplied to the line segment checking unit 7. The line segment checking unit 7 executes line segment check of all the pixels in the match pattern 6.

The "line segment check" means a check of each pixel being processed as to which line segments in directions (such as a horizontal line segment, a vertical line segment and a slanted line segment) in a letter image such pixel is positioned on. The line segment checking unit 7 outputs line segment data 8 representing the determined line segment to an encoding unit 9. The encoding unit 9 selects an optimum template according to the input line segment data 8, and converts the extracted pattern 4 to code data 10 by an encoding process such as that of arithmetic encoding by using the selected template and with reference to the extracted pattern 4 and the match pattern 6. The code data 10 is outputted from an output terminal 11.

Figure 2:
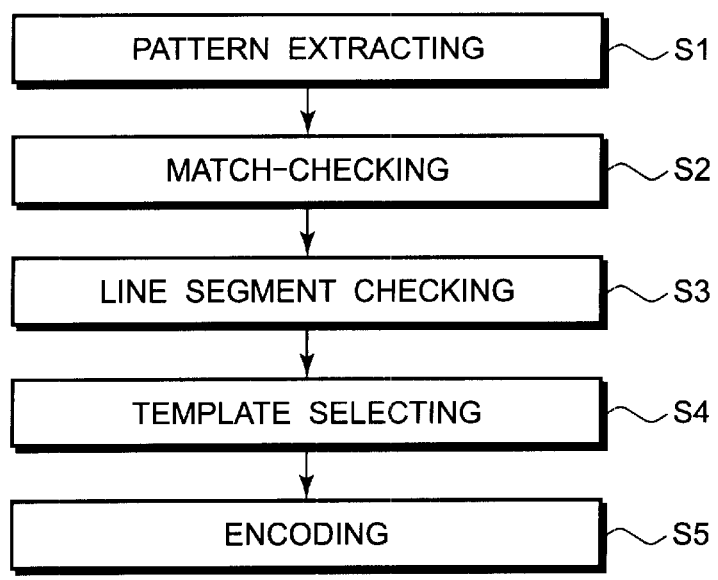
FIG. 2 is a flow chart for showing the operating mode of the pattern matching encoding apparatus according to the invention.

The operation of the embodiment of the invention will now be described with reference also to FIG. 2 which illustrates the operation of the encoding apparatus according to the embodiment of the invention. The pattern extracting unit 3 extracts patterns from the image data 2 supplied from the input terminal 1 (step S1). Each extracted pattern 4 is match-checked in the accumulating/match-checking unit 5 with the library (step S2). When a match pattern is found, the line segment checking unit 7 checks, for each of the pixels in the match patterns, as to which line segments in directions the pixel is positioned on (step S3). The encoding unit 9 selects an optimum template according to the line segment signal 8 (step S4), and encodes the extracted pattern 4 to a code data by arithmetic encoding or the like with the selected template (step S5).

Figure 3:
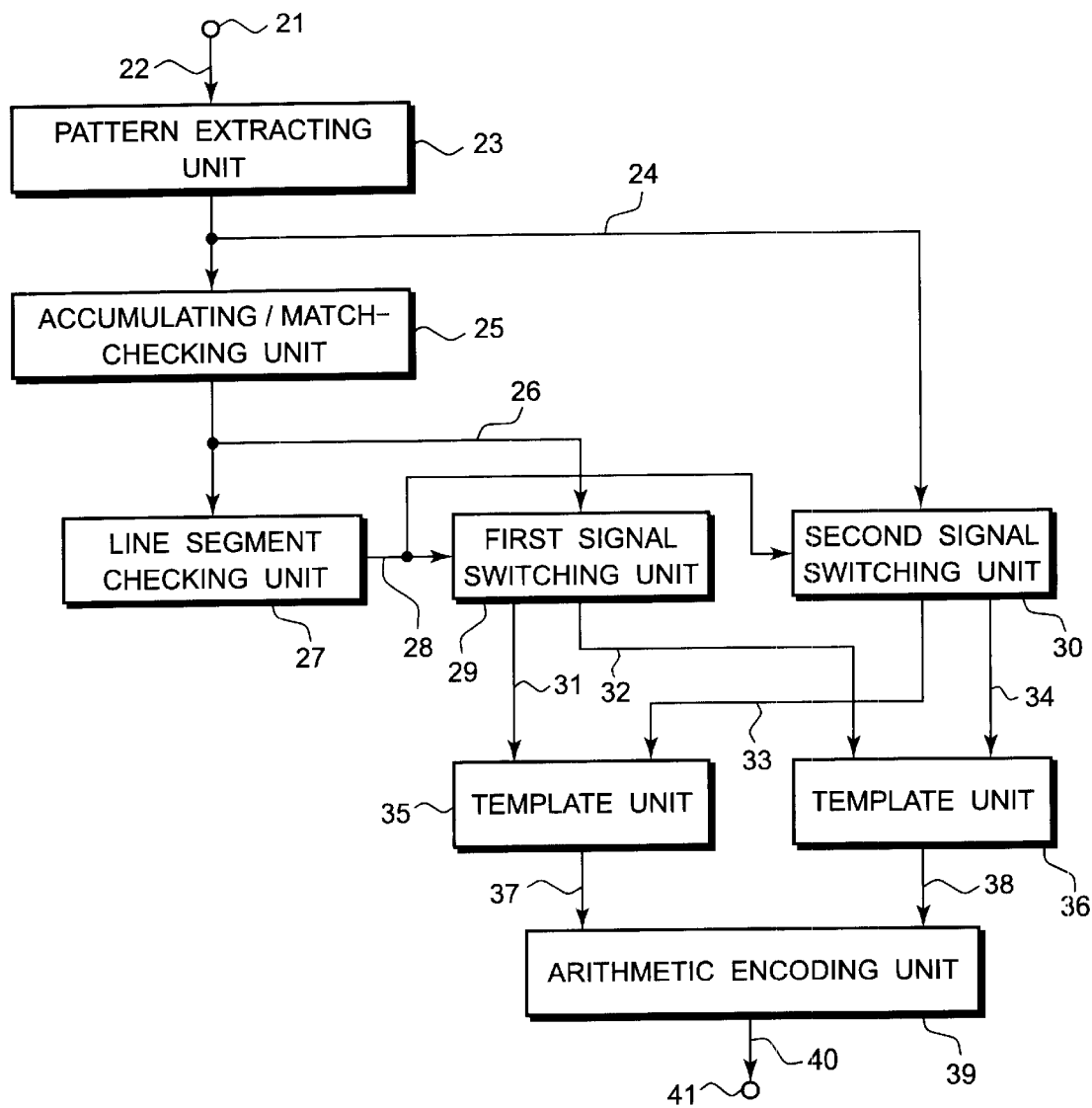
FIG. 3 is a block diagram for showing an example of the pattern matching encoding apparatus according to the invention.

A specific example of the embodiment according to the invention will now be described in detail with reference to the drawings. FIG. 3 shows an example of the encoder according to the invention. A pattern extracting unit 23 extracts patterns from image data 22 supplied from an input terminal 21. The pattern extraction is made by a known method such as a boundary tracing method. Each extracted pattern 24 is supplied to and accumulated in an accumulating/match-checking unit 25 for match-checking with patterns that have been accumulated (hereinafter referred to as "library"). When a match pattern 26 is found in the library, it is supplied to a line segment checking unit 27. The line segment checking unit 27 executes line segment check of all the pixels in the match pattern 26.

As already described, for each pixel being processed, a check is made as to which line segments in directions (such as a horizontal line segment, a vertical line segment and a slanted line segment) in a letter image the pixel is positioned on. The slanted line segment is either one extending upwardly at the right hand or one extending upwardly at the left hand. For the purpose of brevity, only the two kinds, one vertical segment and the other the horizontal segment, are referred to for the description, but it is to be noted that the process remains unchanged even when there is an increase in the kinds of line segment directions. In this example, the encoder 1 shown in FIG. 1 includes a signal switching unit (or first signal switching unit) 29 for sorting out match patterns, a signal switching unit (or second signal switching unit) 30 for sorting out extracted patterns, a template unit 35 for horizontal line segments, a template unit 36 for vertical line segments, and an arithmetic encoding unit 39.

The line segment checking unit 27 supplies a line segment signal 28 to both the signal switching units 29 and 30. According to the line segment signal 28, the signal switching unit 29 supplies the match pattern 26 to either the template unit 35 or the template unit 36. Likewise, the signal switching unit 30 supplies the extracted pattern 24 to either the template unit 35 or the template unit 36 according to the line segment signal 28.

The template unit 35 is a highly efficient template with respect to horizontal line segments, and outputs a template value 37 by simultaneously referring to both the match pattern 31 and the extracted pattern 33. On the other hand, the template 36 is a highly efficient template with respect to vertical line segments, and outputs a template value 38 by simultaneously referring to both the match pattern 32 and the extracted pattern 34.

As for the slanted line segments, a template unit for slanted line segments, specifically a template unit for line segments upwardly slanted at the right hand and a template unit for line segments upwardly slanted at the left hand, may be added to the construction shown in FIG. 3. In this case, each of the signal switching units 29 and 30 supplies extracted pattern to either one of the four template units including the template units 35 and 36 according to the line segment signal 28.

The arithmetic encoding unit 39 executes arithmetic encoding of the supplied template value, and outputs code data 40 thus obtained from an output terminal 41.

Figure 4:
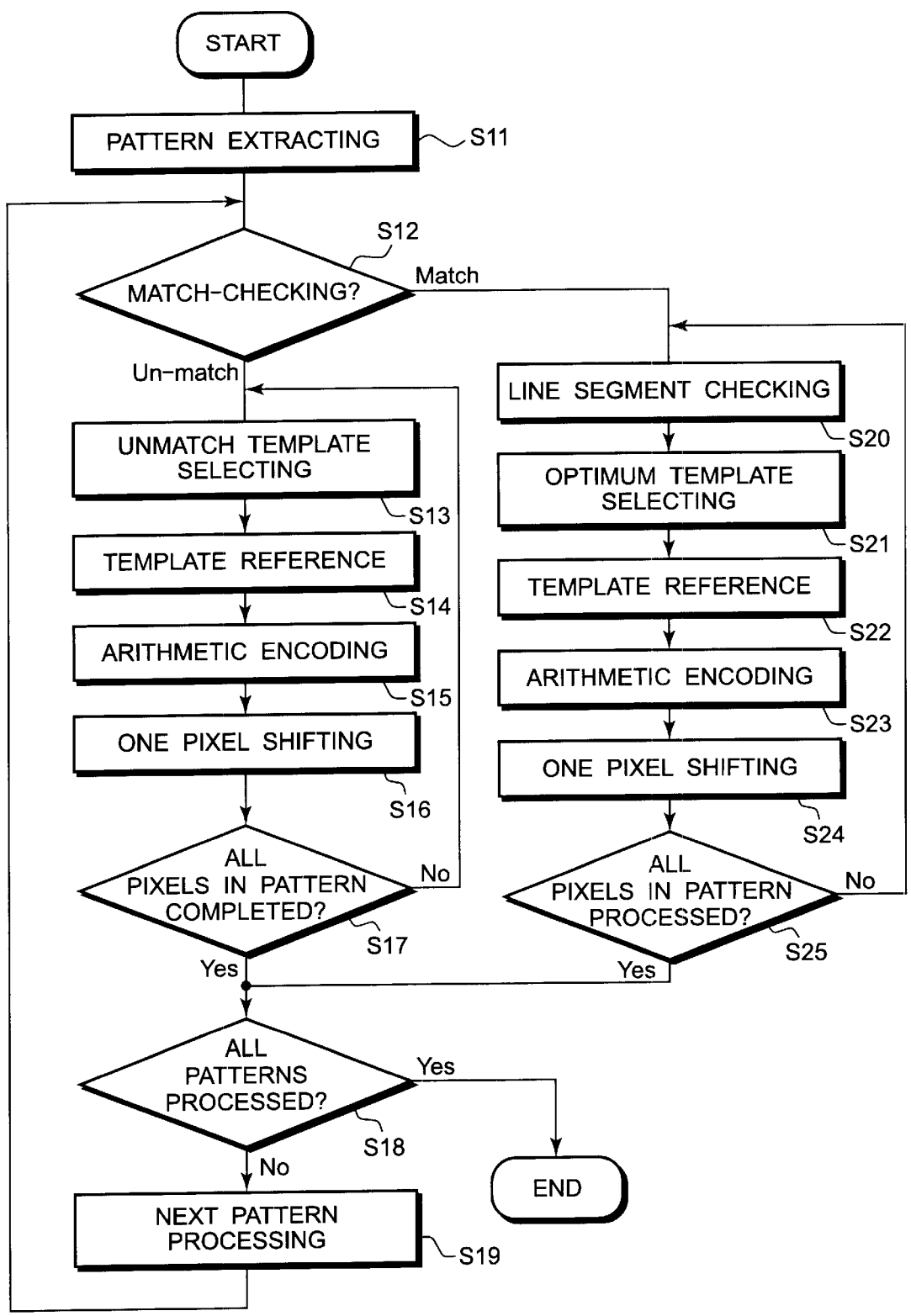
FIG. 4 is a flow chart for showing the operation of the example of the pattern matching encoding apparatus.
Figure 5:
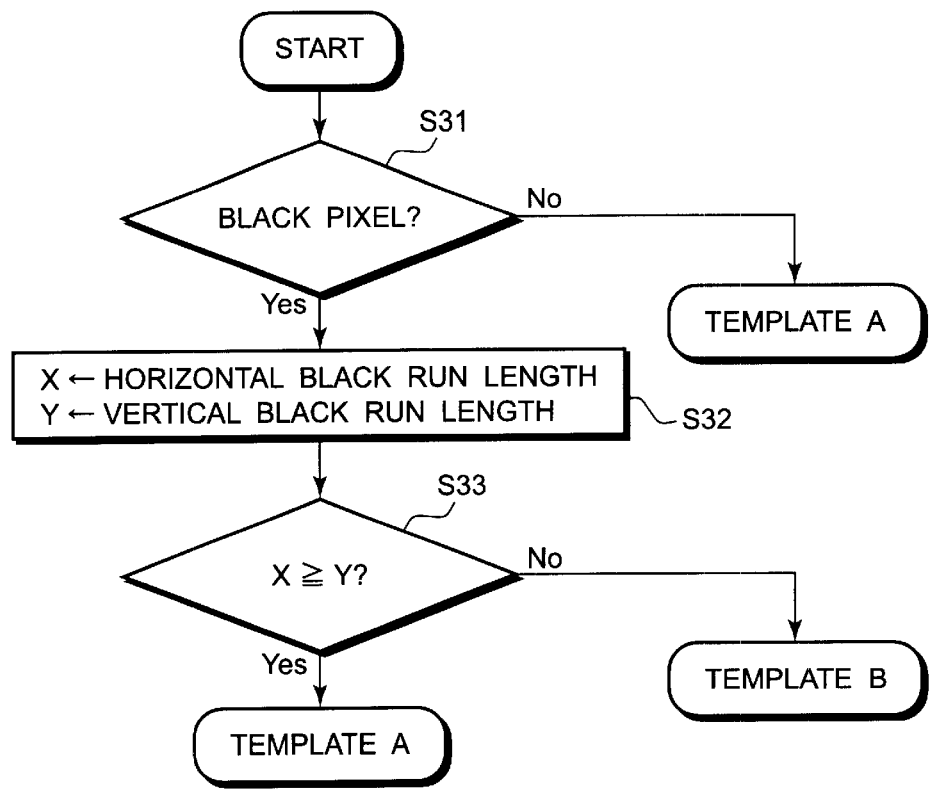
FIG. 5 is a flow chart for showing a line segment check routine according to the invention.

The operation of the apparatus according to the embodiment will now be described with reference also to FIG. 4. FIG. 4 is a flow chart illustrating the operation of the apparatus. Letter images (i.e., patterns) are extracted from an image (step S11), and each pattern is match-checked with the library (step S12). When a match pattern is found in the library, the line segment check is executed on each pixel in the match pattern (step S20). FIG. 5 is a flow chart illustrating a line segment check routine in this example.

Referring to FIG. 5, a check as to whether template A or B is to be used, is made by checking whether pixel being processed is positioned on a horizontal or a vertical line segment. When the pixel being processed is on a horizontal line segment or when the image is on neither the horizontal nor the vertical line segment, the template A is selected. When the pixel is on the vertical line segment, the template B is selected.

The routine illustrated in FIG. 5 will now be described in greater details. When the routine is started, a check is made as to whether the pixel being processed is a white or a black pixel (step S31). When the pixel is a white pixel, it is not positioned on any letter, and hence it is excluded from the process. At this time, the template A is used in this example.

When the pixel is found as being a black pixel, the horizontal black run length and the vertical black run length are counted (step S32). Then, the two run lengths are compared (step S33). When the horizontal run length is found to be greater, it is determined that the black pixel is positioned on a horizontal line segment, and the template A is selected. When the vertical run length is greater, it is determined that the black pixel is positioned on a vertical line segment, and the template B is selected.

Referring back to FIG. 4, when the optimum template is selected according to the result of the line segment check (step S21), this template is referred to (step S22), and arithmetic encoding is executed (step S23). Then, the pixel being processed is shifted by one pixel (step S24). Thereafter, the routine goes back to the step S20 to repeat the process from the line segment check.

When no match pattern has been found in the match check (i.e., when the checked pattern is unmatched), no line segment check is made in this example and the template for the unmatched pattern is selected (step S13). However, in the case of an unmatched pattern, like the matched pattern, it is possible to make the line segment check with reference to each of the pixels in the pattern. In this case, it is necessary to superimpose the data as to which template is to be used in decoding at the decoder side, in the encoded data.

In the case of a matched pattern, the line segment check is made with reference to the library. This means that so long as libraries of the same content are constructed on both the encoder and decoder sides, the same result of the line segment check is obtained when the line segment check is made on either side. Thus, in this case, it is unnecessary to send data as to which template was used as the code data.

In either case of the matched pattern or the unmatched pattern, when all the pattern pixels have been encoded, the process is ended. Then, the step proceeds to the process with respect to the next pattern (step S19). When all the patterns in the image have been processed, the routine is ended.

Figure 6:
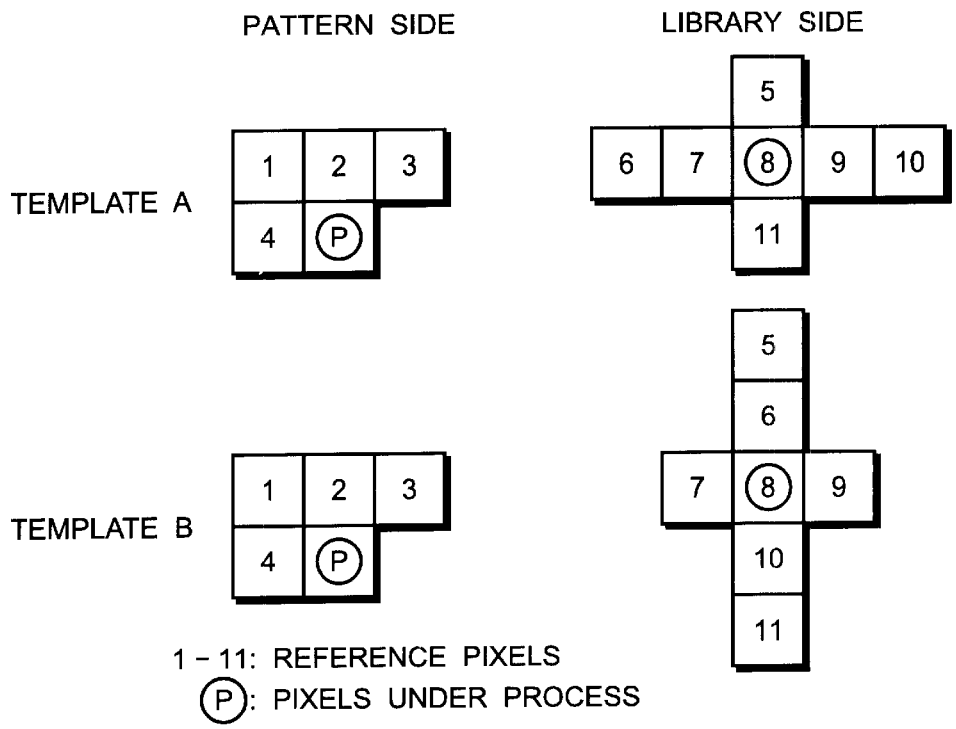
FIG. 6 is a diagram for showing the forms of templates used according to the invention.

FIG. 6 shows the forms of templates used in this example. The template A has a horizontally elongate reference area, and is highly efficient for horizontal line segments. The template B has a vertically elongate reference area, and is highly efficient for vertical line segments.

An effect that is obtainable according to the invention is that, since a highly efficient template is selected in the pattern encoding at all times, it is possible to reduce the number of codes that are involved. It is thus possible to accumulate data with smaller memory capacity and transfer data in shorter period of time.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A method for pattern matching encoding of patterns in at least one of input binary image data and multi-level image data, the method comprising;
   segment-checking a pixel being processed in an image containing a plurality of pixels to determine an orientation of a line segment containing said pixel being processed;
   encoding said pixel being processed using a template selected based on said orientation of a line segment containing said pixel being processed;
   extracting patterns from image data supplied from an input terminal;
   accumulating each extracted pattern and executing a match check thereof with patterns that have been accumulated;
   checking, when a match pattern is found, each pixel in said match pattern to determine an orientation of a line segment said each pixel is positioned on;
   selecting an optimum template according to said orientation of a line segment determined as a result of said checking step; and
   encoding said extracted pattern by an arithmetic encoding method with a template selected in said selecting step.

2. The method for pattern matching encoding according to claim 1, in which said checking step includes checking at least a horizontal line segment, a vertical line segment and a slanted line segment.

3. The method for pattern matching encoding according to claim 1,
   wherein said optimum template includes a template having a horizontally elongated reference area for a line segment having a horizontal orientation, and
   wherein said optimum template includes a template having a vertically elongated reference area for a line segment having a vertical orientation.

4. An apparatus for pattern matching encoding of patterns comprising:
   a pattern extracting unit configured to extract patterns from at least one of an input binary and a multi-level image data;
   an accumulating/match-checking unit configured to accumulate each extracted pattern and executing a match check thereof with patterns that have been accumulated;
   a line segment checking unit, said line segment checking unit configured to perform a line segment check of each pixel in at least one of the match pattern and the extracted pattern to determine an orientation of a line segment said each pixel is positioned on; and
   an encoding unit, said encoding unit encoding at least one of said extracted pattern and said match pattern by selecting a template having an optimum form according to an output from said line segment checking unit.

5. The apparatus for pattern matching encoding of patterns according to claim 4, wherein said line segment check performed by said line segment checking unit is made at least with respect to a horizontal line segment, a vertical line segment and a slanted line segment.

6. The apparatus for pattern matching encoding of patterns according to claim 5, wherein:
   said encoding unit includes a first signal switching unit for sorting out match patterns, a second signal switching unit for sorting out extracted patterns, a plurality of template units corresponding to horizontal, vertical and slanted line segments, and an arithmetic encoding unit;
   said first signal switching unit supplies a match pattern to one of said plurality of template units according to a result of said line segment check performed by said line segment checking unit;
   said second signal switching unit supplies said extracted pattern to one of said plurality of template units according to a result of said line segment check performed by said line segment checking unit;
   said plurality of template units output a template value by referring simultaneously to said match pattern and said extracted pattern; and
   said arithmetic encoding unit arithmetically encoding said template value received from said plurality of template units and outputting code data.

7. A method for pattern matching encoding of image data, the method comprising;
- segment-checking each pixel in a multi-pixel image to determine an orientation of a line segment containing said each pixel;
- encoding said each pixel using a template selected based on said orientation of a line segment containing said pixel;
- shifting said, template to perform sequential encoding of said multi-pixel image;
- extracting patterns from image data supplied form an input terminal;
- storing each pattern extracted and comparing said pattern to previously stored patterns to determine if said each pattern matches one of said previously stored patterns;
- checking, when a match pattern is found, each pixel in said match pattern to determine an orientation of a line segment said each pixel is positioned on;
- selecting a template according to said orientation of a line segment determined as a result of said checking; and
- encoding said each pattern by an arithmetic encoding method with said template.

8. The method for pattern matching encoding according to claim 7, in which said checking step includes checking a horizontal line segment and a vertical line segment.

9. The method for pattern matching encoding according to claim 8, in which said checking step further includes checking a slanted line segment.

10. The method for pattern matching encoding according to claim 7,
- wherein said template includes a template having a horizontally elongated reference area for a line segment having a horizontal orientation, and
- wherein said template includes a template having a vertically elongated reference-area for a line segment having a vertical orientation.

11. A pattern encoding apparatus comprising:
- a pattern extracting unit;
- a match-checking unit;
- a line segment checking unit; and
- an encoding unit;
- wherein upon a match between a first pattern extracted by said pattern extracting unit and a second pattern from one of a plurality of previously stored patterns, said line segment checking unit checks each pixel in one of said first pattern and said second pattern to determine, for said each pixel, an orientation of a line segment including said each pixel, and
- wherein said encoding unit encodes said one of said first pattern and said second pattern by selecting a template based on said orientation of said line segment including said each pixel.

12. A pattern encoding apparatus as claimed in claim 11, wherein said line segment checking unit is configured to check each pixel in one of said first pattern and said second pattern to determine, for said each pixel, wherein said each pixel is orientated on one of a horizontal line segment, a vertical line segment, and a slanted line segment.

13. A method for pattern matching encoding image data, said method comprising the steps of:
- segment-checking each of a plurality of pixels in a multi-pixel image to determine an orientation of a line segment containing said each pixel, said step of segment checking including;
  - determining whether said pixel is activated;
  - selecting a first template if said pixel is not activated;
  - selecting said first template if said pixel is activated and a horizontal run length of said line segment is at least as large as a vertical run length of said line segment; and
- selecting a second template if said vertical run length is larger than said horizontal run length;
- arithmetically encoding said each pixel using selected first or second template; and
- shifting said selected template to perform sequential encoding of said multi-pixel image.

14. An image data encoding system comprising:
- a segment-checking unit operable to determine an orientation of a line segment on which a pixel being processed is located;
- an encoding unit operable to encode an extracted pattern, the pattern including the line segment and the encoding including selecting an optimum template from at least two templates based on the orientation of the line segment;
- a run-length calculation unit operable to determine a length of the line segment in each of a plurality of directions; and
- a comparator operable to compare the relative lengths of the line segment in each of the directions,
- wherein the orientation of the line segment is determined from the list of orientations comprising vertical, horizontal and diagonal.

* * * * *